Patented Mar. 16, 1937

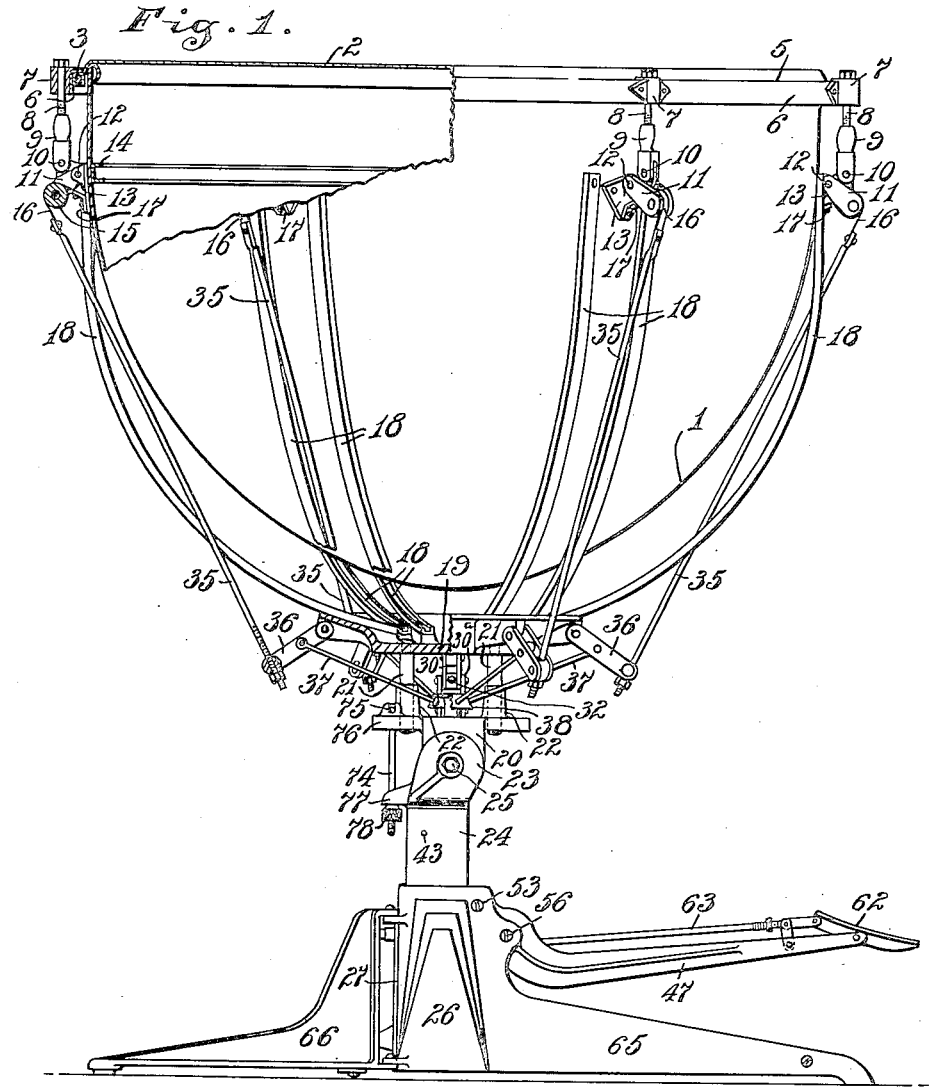

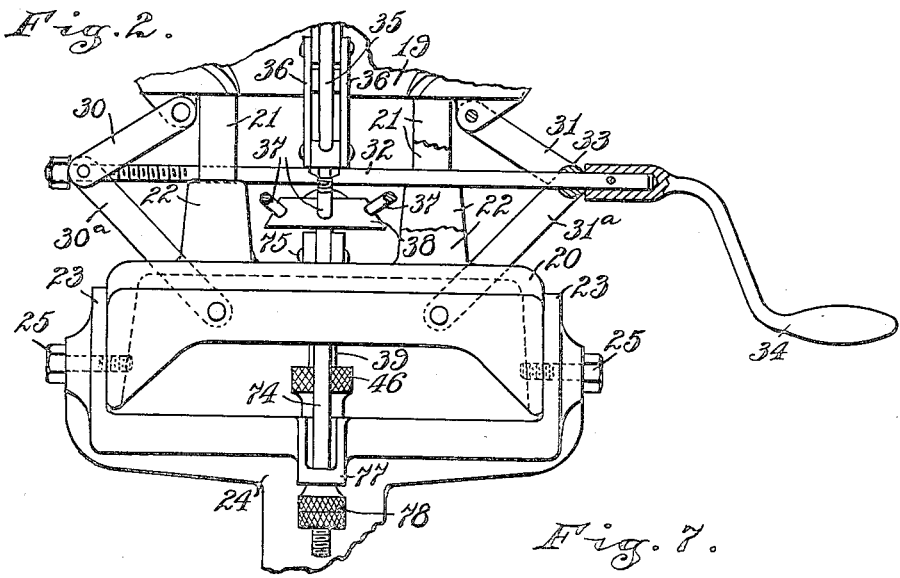
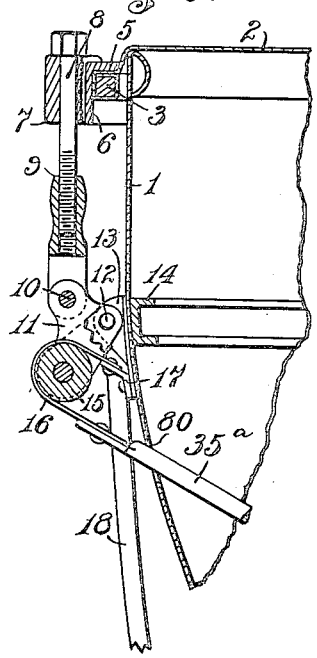
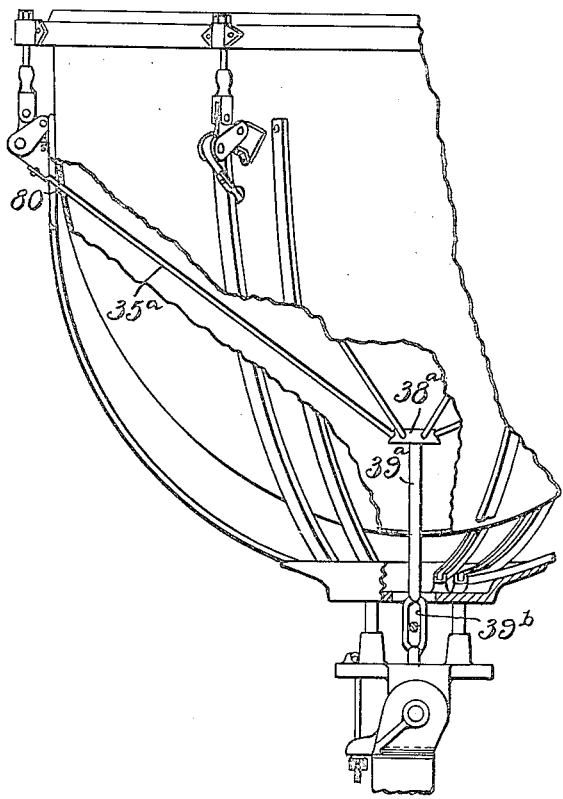

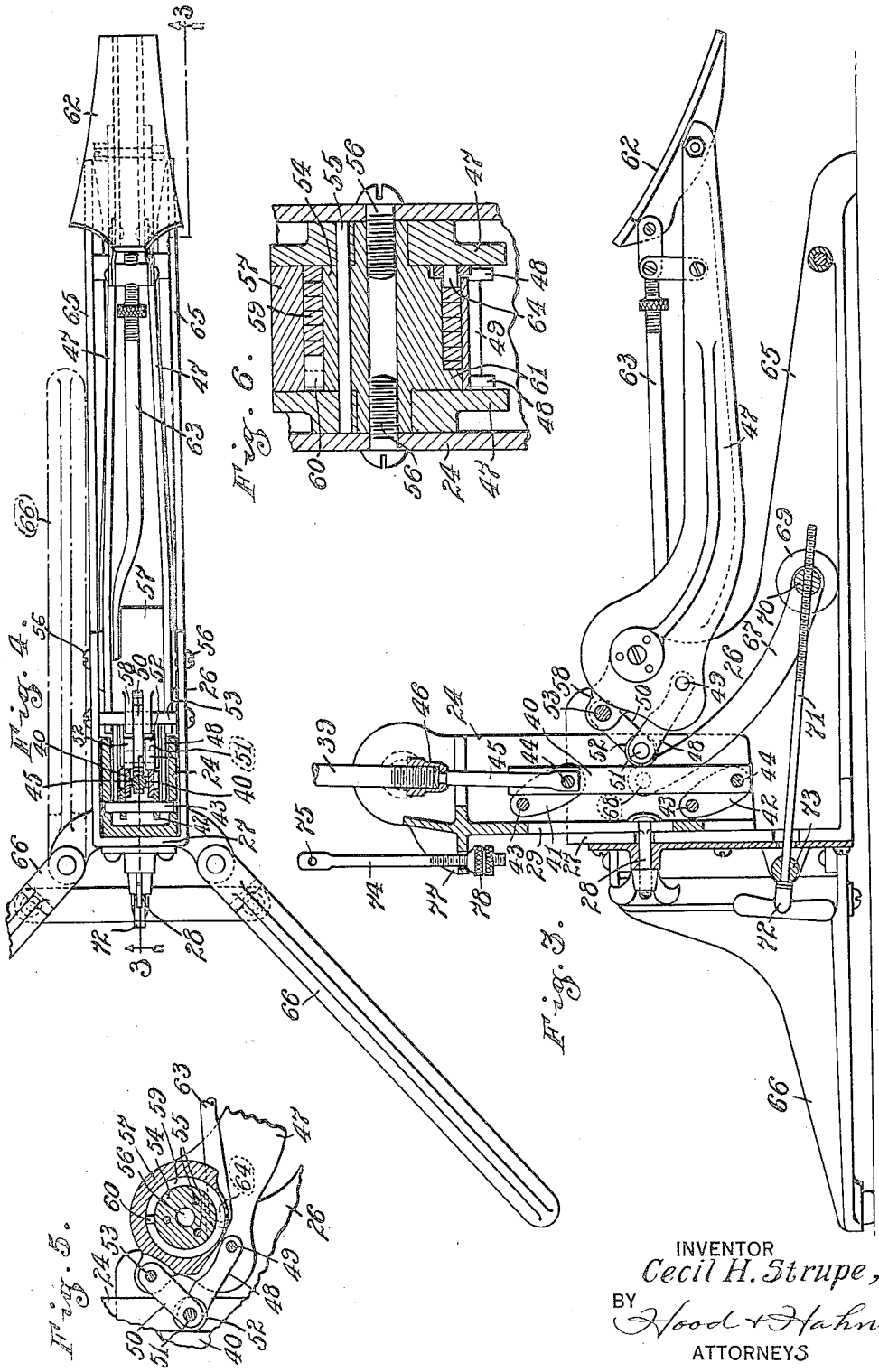

2,074,194

UNITED STATES PATENT OFFICE 2,074,194

TIMPANO ADJUSTER

Cecil H. Strupe, Indianapolis, Ind.

Application June 29, 1935, Serial No. 29,058

11 Claims. (Cl. 84—419)

My invention relates to improvements in timpani and particularly to means for tuning the same.

It is one of the objects of my invention to provide means for adjusting the tension of the head to establish the base note thereof and to provide means additionally whereby the tension of the head may be readily varied to produce variations in the scale in accordance with the orchestration demands.

Another object of my invention is to provide a simplified means for increasing the leverage of the adjustment member for the variation of the tension of the head.

For the purpose of disclosing my invention I have illustrated certain embodiments thereof in which Fig. 1 is an elevation partly in section of a timpano embodying my invention;

Fig. 2 is a detail elevation of the means for adjusting for base note;

Fig. 3 is a longitudinal sectional view, on the line 3—3 of Fig. 4, of the adjusting means for the range of notes;

Fig. 4 is a plan view, partly in section, of the adjusting mechanism shown in Fig. 3;

Fig. 5 is a detail view of the clutch lock;

Fig. 6 is a partial sectional view of the clutch lock;

Fig. 7 is a partial view of a modification of the structure illustrated in Fig. 1; and Fig. 8 is a detail view of the lever mechanism, shown in connection with the structure illustrated in Fig. 7 but applicable likewise to the structure illustrated in Fig. 1.

In the structures illustrated the usual timpano shell 1 is provided having a head 2, the periphery of which is wrapped around a flesh ring 3 arranged on the exterior of the shell and this ring takes beneath the tension ring which, in cross section, takes the form of an angle member, one leg 5 of which engages over the flesh ring and the other leg 6 of which is provided with a plurality of brackets 7 through which extend bolts 8. Each of these bolts threads into a socket 9. Each socket is pivoted as at 10 upon a bell crank lever 11 in turn pivoted at 12 to a bracket 13 secured to the outer circumference of the shell. The shell at the point where the bracket 13 is secured in position is preferably braced, on the interior by a channel ring 14, as shown more particularly in Figs. 1 and 8. The opposite leg of the bell crank lever 11 is provided with a roller 15 over which is adapted to pass a flexible preferably metal strap 16, one end of which is anchored by a lug 17 to the bracket 13.

The shell 1 is supported by suitable bracket arms 18 extending upwardly from an adjusting supporting head 19, said arms being secured at one end to the shell by rivets or other means extending through the shell and through the bracing ring 14, and at their opposite ends being secured to the adjusting head 19. This adjusting head 19 is vertically adjustably supported on a supporting bracket 20 through the medium of guiding pins 21 socketing into supporting lugs 22 on the bracket 20. The bracket in turn is secured between the bifurcated arms 23 of an adjustable support 24 by means of clamping and pivot bolts 25. The adjustable support 24 is vertically adjustably mounted on the base 26 which is provided with a vertically extending plate 27 against which one face of the support 24 slides and with a clamping bolt 28 extending through a slot 29 in the support 24. It is obvious that by loosening the bolt 28 the support 24 may be adjusted vertically relatively to the base 26 and then maintained in its adjusted position by the tightening of the bolt 28. This adjustment provides for adjustment of the timpano as to height.

In addition to the sliding connection established by the pins 21 and the socketed lugs 22, I provide means for vertically adjusting the head 19 relatively to the bracket 20 and thus to the base 26 which comprises a set of toggle links 30 and 30a disposed on one side and a second set of toggle links 31 and 31a disposed on the other side. A rod 32 extends through the pivot pin 33 of the links 31, 31a and is threaded at its opposite end through the pivot pin of the links 30, 30a. A handle 34 is axially and angularly anchored at one end of rod 32 so as to bear upon the pivot pin 33. It is apparent, therefore, that by turning the rod 32 in one direction or the other the free pivots of the toggle links will be caused to approach or recede from one another, therefore tending to straighten or buckle the links and accordingly raising or lowering the head 19 relatively to the bracket 20 and relatively to the base 26.

Each of the straps 16, heretofore described, is connected by a rod 35, in the structure illustrated in Fig. 1, with a pivoted lever arm 36 mounted on the head 19 and this pivoted lever arm in turn is connected by a rod 37 with a hub 38. This hub 38 is mounted on the upper end of a reciprocable rod 39 in turn connected to a reciprocating plate 40, which plate is connected to the head 24 by a pair of parallel links 41 and 42, each of which is connected at one end by a pivot 43 with the member 24 and at the opposite end by a pivot rod 44 with the plate 40. The rod 39 is connected to the plate 40 through the medium of a link 45 connected to the upper pivot rod 44 at one end and provided with a rotatable screw socket 46 receiving the threaded end of the rod 39.

For vertically adjusting the plate 40 I provide an operating pedal 47 pivoted to the base 26 and operating a link mechanism bearing on the plate 40. This link mechanism comprises a pair of links, one, 48, being pivotally connected at 49 to the pedal 47 and pivotally connected to the opposite link 50 by the pivot pin 51 on which is mounted a roller 52 adapted to bear against the side of the plate 40. This link 50 in turn is connected to a pin 53 extending from the base 26 and therefore is stationarily connected. The pedal 47, which comprises a pair of spaced-apart arms, has secured between these arms a hub 54 which hub is connected to the arms through pins 55 extending through the hub and into the arms and the hub 54 is in turn secured to the base 26 through the pivot screws 56, whereby the pedal and its hub are pivotally mounted on the base. A sleeve 57 surrounds the hub 54 and this sleeve is provided with an ear 58 receiving the pin 53 so that the sleeve is thus locked against rotative movement. Interposed between the hub 54 and the sleeve 57 is a coiled spring friction clutch 59 having one end 60 thereof entering a recess in an annular flange 61 on the hub so that the spring is locked to the hub. This spring has a frictional engagement with the inner diameter of the sleeve 57 and, due to the expansive action of the sleeve under this friction engagement, the hub and sleeve will be locked, frictionally, together against any movement tending to raise the outer end of the pedal 47. For releasing this clutch, I provide a rocking plate 62 which is pivotally mounted on the outer end of the pedal 47 and at one end is connected by a rod 63 with a pin 64 connected to one end, the free end, of the coiled spring 59. By depressing the free end of this plate 62 the rod 63 will tend to contract the coiled spring 59, thus disengaging the clutch connection between the pedal 47 and the stationary sleeve 57, permitting movement of the pedal up or down. As soon as the free end of the plate 62 is released, or the opposite end of the plate 62 is depressed, the coiled spring will expand locking the pedal 47 in any position to which it may have been moved.

The base 26 is provided with an extension leg 65 and with a pair of hingedly mounted legs 66 to provide a tripod base for supporting the parts and the support 24 may be adjusted to this base by means of a link 67, one end of which is pivotally connected as at 68 to the support 24 and the other end of which is provided with a roller 69 bearing on the bottom of the leg 65 and provided with a pin 70 through which passes a screw rod 71 having a handle 72 at its opposite end passing through a cross rod 73. It is obvious that when the clamp nut 28 is released, by rotating the handle 72 in one direction or the other, the lower end of the link 67 will move in a horizontal direction thus forcing the upper end 68 upwardly or downwardly to adjust the support 24, after which adjustment, the clamp 28 may be tightened to hold the parts in their adjusted position.

In operation, the initial tension on the head 2 is obtained by the proper adjustment of the bolts 8 to obtain an even tension of the head at all points. This is preferably obtained with the pull-rod 39 at its uppermost position which, of course, would mean that the pedal 47 is raised to its uppermost position. At the same time the head 19 is in its lowermost position relative to bracket 20. With this fundamental adjustment the pitch of the base note may be raised by rotating the handle 34 to expand the toggle links 31, 31a and 30, 30a to raise the head 19. Due to the fact that the hub 38 is now stationary and the links 36 are connected to the hub by the rods 37, the raising of this head 19 will tend to lower or rock the outer end of the links 36 on their fulcrum points on the rods 37, placing a tension on these rods and through the instrumentality of the flexible bands 16 rock the bell crank levers 11 on their pivots 12 to place the desired tension on the head 2 to obtain the desired base note. After this tension has been obtained, the range of notes upward may be varied by the depression of the pedal 47 which will in turn lower the hub 38, thus increasing the tension on the head and by thus raising or lowering the pedal 47 the tone of the timpano may be readily varied.

It is sometimes desirable to tilt the timpano in order to make it more accessible for playing, especially when the artist is sitting down and it will be noted that the bracket member 20 is pivoted by the pivot pin 25 to the member 23. The shell is maintained in its vertical position through the medium of a rod 74 which is pivotally connected as at 75 to an extension 76 of the bracket 20 and extends downwardly and through a lug 77 laterally extending from the support 24. A nut 78 is screw-threaded on the lower end of the rod 74 and bears on this lug 77. By loosening the nut 78 the weight of the shell and its associated parts will tend to tilt it to the right, looking at Fig. 1. This tilting action, however, will not in any degree affect the adjusting mechanism nor the operation thereof.

In the structure illustrated in Fig. 7, I have shown an arrangement whereby the tensioning rods 35 and the hub 38 are arranged within the shell of the timpano. In this structure, the shell of the timpano, at the proper points, is provided with openings 80 through which the tension rods 35a are adapted to extend to the interior of the shell and are connected directly to the hub 38a which, like the hub 38, is mounted on the top of the rod 39a. In this instance, in order to accommodate the shaft or rod 32, the rod 39a is spread as at 39b to permit the shaft 32 to pass therethrough. The lower end of the rod 39a is of the same construction as the rod 39 and need not be described.

The operation of the parts in this construction is similar to that of the constructions heretofore described except that the pull of the rod 39a on the tension rods 35a is direct instead of through the linkage mechanism as illustrated in Fig. 1.

I claim as my invention:

1. In a timpano, the combination with a base, a shell supported on said base and a head associated with said shell, of head tensioning means comprising a plurality of bell crank levers each pivotally mounted on said shell and having one arm thereof connected to said head, actuating means for said tensioning means supported on said base and a connection between each of said bell crank levers and said actuating means comprising a cable having one end connected to the shell and the other end connected to the actuating means and the bight of said cable engaging the opposite arm of the bell crank lever.

2. In a timpano, a base, a shell-supporting standard vertically adjustable on said base, a shell carried by said supporting standard and provided with a vibrant head, head tensioning means carried by said supporting standard and comprising an actuating element arranged at the lower end of said supporting standard, a control pedal mounted on the base and relatively shiftable interengaging elements carried respectively by said actuating element and pedal permitting vertical adjustment of the actuating element by the pedal to variably tension the head, and also permitting vertical adjustment of the shell and said actuating element independent of the pedal without shifting the actuating element relative to the vibrant head.

3. In a timpano, a base; a shell-supporting standard vertically adjustable on said base; a shell, associated vibrant head and head-tensioning means carried by said supporting standard, said tensioning means comprising an actuating element at the lower end of said standard adjacent the base, a pedal adjustably mounted on the base, the pedal and said actuating member interengaging to permit vertical adjustment of the shell supporting standard without head-tensioning action of the actuator and adjustment of the pedal on the base to cause head-tensioning actuation of the actuator.

4. In a timpano, a base; a shell-supporting standard vertically adjustable on said base; a shell, associated vibrant head and head-tensioning means carried by said supporting standard, said tensioning means comprising an actuating element at the lower end of said standard adjacent the base, a parallel-link support for said actuating element, a pedal pivoted on the base and provided with a part engageable with said actuating element to variably position the same laterally and longitudinally, said engagement being such as to permit longitudinal positioning of said actuating element independently of the pedal.

5. In a timpano, a base, a vertically extending actuator for head tensioning means, a pair of parallel-motion links supporting said actuator on said base, and a pedal pivoted on said base and engaging said actuator to laterally position it.

6. In a timpano, a base, a shell-supporting standard vertically adjustable on the base, a pair of parallel-motion links pivoted on said standard near its lower end, a vertically extending actuator for head-tensioning means pivoted to and supported by said links, and a pedal mounted on the base and engageable with said actuator to laterally displace the same.

7. In a timpano, a base, a shell-supporting standard vertically adjustable on the base, a pair of parallel-motion links pivoted on said standard near its lower end, a vertically extending actuator for head-tensioning means pivoted to and supported by said links, a pedal mounted on the base, and a toggle-link anchored at one end on the base and at the other end on the pedal and with its joint engageable with said actuator.

8. In a timpano, a base, a vertically extending actuator for head-tensioning means, a pair of parallel-motion links supporting said actuator on said base, a pedal pivoted on said base, and a toggle-link anchored at one end on the base and at the other end on the pedal and with its joint engageable with said actuator.

9. In a timpano, the combination of a shell-supporting standard comprising upper and lower sections non-rotatively associated and adjustable connecting elements whereby the length of said standard may be varied, a shell, vibrant head and a head-tensioning ring carried by said upper standard section, a pull-rod anchored on said lower standard section, connections between said pull-rod and said ring, and a manipulating pedal associated with said pull-rod.

10. In a timpano, the combination of a shell-supporting standard comprising upper and lower sections non-rotatively associated and adjustable connecting elements whereby the length of said standard may be varied, a shell, vibrant head and a head-tensioning ring carried by said upper standard section, a pull-rod anchored on said lower standard section, connections between said pull-rod and said ring, a base, a connection between said base and said lower standard section permitting vertical adjustment of the lower section of said standard, and a manipulating pedal mounted on the base, and connections between pedal and pull-rod permitting adjustment of the pull-rod without affecting the head-tensioning ring.

11. In a timpano, a combination with a base, a shell non-rotatively supported by said base, and a head associated with said shell, of head tensioning means, comprising a plurality of bell crank levers each pivotally mounted on said shell and each having one arm thereof connected to said head, an actuating element mounted on said base, cables each having one end connected to the shell and the opposite end connected to the actuating element, the bights of said cables each engaging an arm of one of said bell crank levers, and an adjustable shell support interposed between the base and shell.

CECIL H. STRUPE.